(12) United States Patent
Moerman et al.

(10) Patent No.: US 8,170,087 B2
(45) Date of Patent: May 1, 2012

(54) CORRELATION COPROCESSOR

(75) Inventors: Filip Jozef Moerman, Tourrettes-sur-Loup (FR); Raphael Defosseux, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 11/863,833

(22) Filed: Sep. 28, 2007

(65) Prior Publication Data
US 2008/0279261 A1 Nov. 13, 2008

(30) Foreign Application Priority Data

May 10, 2007 (EP) .................................. 07290585

(51) Int. Cl.
*H04B 1/00* (2006.01)
(52) U.S. Cl. ......... 375/150; 375/149; 375/148; 375/147
(58) Field of Classification Search .................. 375/150, 375/147, 148
See application file for complete search history.

(56) References Cited

U.S. PATENT DOCUMENTS

| | | | |
|---|---|---|---|
| 5,102,220 A * | 4/1992 | Tiedeke | 356/5.05 |
| 5,528,629 A * | 6/1996 | van der Krogt et al. | 375/244 |
| 5,541,661 A * | 7/1996 | Odaka et al. | 375/240.15 |
| 5,680,421 A * | 10/1997 | Shiino et al. | 375/368 |
| 5,982,763 A * | 11/1999 | Sato | 370/342 |
| 6,201,828 B1 * | 3/2001 | El-Tarhuni et al. | 375/150 |
| 6,289,064 B1 * | 9/2001 | Hiramatsu et al. | 375/365 |
| 6,385,259 B1 * | 5/2002 | Sung et al. | 375/343 |
| 6,522,686 B1 * | 2/2003 | Ogami | 375/149 |
| 6,959,035 B2 * | 10/2005 | Taipale et al. | 375/150 |
| 6,985,516 B1 * | 1/2006 | Easton et al. | 375/150 |
| 7,154,872 B2 * | 12/2006 | Hsuan | 370/335 |
| 2001/0014114 A1 * | 8/2001 | Baltersee et al. | 375/148 |
| 2001/0048714 A1 * | 12/2001 | Jha | 375/150 |
| 2002/0037028 A1 * | 3/2002 | Baltersee et al. | 375/148 |
| 2002/0057729 A1 * | 5/2002 | Farbod et al. | 375/150 |
| 2002/0109617 A1 * | 8/2002 | Freidhof | 341/61 |
| 2002/0116178 A1 * | 8/2002 | Crockett | 704/200.1 |
| 2002/0141482 A1 * | 10/2002 | Agami et al. | 375/147 |
| 2002/0159469 A1 * | 10/2002 | Arimura | 370/441 |
| 2003/0118085 A1 * | 6/2003 | Taipale et al. | 375/150 |
| 2003/0123408 A1 * | 7/2003 | Saitou | 370/335 |
| 2003/0202488 A1 * | 10/2003 | Hsuan | 370/331 |
| 2003/0231703 A1 * | 12/2003 | Lugil | 375/148 |
| 2003/0235237 A1 * | 12/2003 | Smolyar | 375/148 |
| 2004/0136478 A1 * | 7/2004 | Yu et al. | 375/343 |
| 2005/0047484 A1 * | 3/2005 | He et al. | 375/148 |

(Continued)

*Primary Examiner* — Chieh M Fan
*Assistant Examiner* — Santiago Garcia
(74) *Attorney, Agent, or Firm* — Ronald O. Neerings; Wade James Brady, III; Frederick J. Telecky, Jr.

(57) ABSTRACT

Apparatus and method for providing correlation in a CDMA receiver. A Generic Correlation Coprocessor comprises one or more correlation blocks. Each correlation block comprises a correlation input buffer coupled to one or more correlators. The correlators are coupled to an interpolator input buffer and to a correlator output buffer. One or more interpolators are coupled to the interpolation input buffer and to the correlation output buffer. The correlators correlate the received signal with PN codes to produce a correlated signal. The correlated signal is stored in the correlator output buffer and/or the interpolation input buffer, and provided from the interpolation input buffer to the one or more interpolators. The one or more interpolators interpolate the correlated signal to produce an interpolated signal. The interpolated signal is stored in the correlator output buffer. Signals are provided from the correlator output buffer to other receiver processing systems.

15 Claims, 4 Drawing Sheets

U.S. PATENT DOCUMENTS

| | | | |
|---|---|---|---|
| 2005/0177332 A1* | 8/2005 | Lemma et al. | 702/106 |
| 2006/0067383 A1* | 3/2006 | Cozzo et al. | 375/147 |
| 2006/0098719 A1* | 5/2006 | Baltersee et al. | 375/148 |
| 2007/0064658 A1* | 3/2007 | Zou | 370/335 |
| 2007/0297494 A1* | 12/2007 | Lindoff | 375/148 |
| 2008/0205492 A1* | 8/2008 | Gorday et al. | 375/150 |
| 2008/0279261 A1* | 11/2008 | Moerman et al. | 375/150 |
| 2009/0022212 A1* | 1/2009 | Ito et al. | 375/150 |
| 2009/0129458 A1* | 5/2009 | Pietraski et al. | 375/232 |

\* cited by examiner

CORRELATION COPROCESSOR

CROSS-REFERENCE TO RELATED APPLICATIONS

The present application claims priority to and incorporates by reference European patent application No. 07290585.4, filed on May 10, 2007.

BACKGROUND

Third generation ("3G") mobile communication systems, such as cellular telephone systems, predominantly employ Code Division Multiple Access ("CDMA") methods. Wideband CDMA ("WCDMA") is a widely deployed version of CDMA employed in Universal Mobile Telecommunications System ("UMTS") networks.

CDMA is a variety of direct sequence spread spectrum communications. A CDMA signal occupies a bandwidth much greater than is necessary to send the information carried by the signal, and as a result possesses a measure of interference immunity and multi-user access capability. CDMA uses unique pseudo-noise ("PN") codes, also known as spreading codes, to increase the bandwidth, or spread the baseband data before transmission. The PN code sequences are produced at a much higher rate than the baseband data and different codes are applied to each user's data within a cell. The bits of a spreading code are known as "chips" to distinguish them from data bits. The ratio of the chipping rate (i.e., the inverse of the chip period) to the baseband data rate is known as the spreading factor. The PN codes assigned to different users within a cell are selected to minimize cross-correlation between the codes. This allows the signal receiver to extract a user's data from the aggregate received signal by correlating the received signal against the spreading code assigned to the user. The process of correlating received signal with a known spreading code is called despreading.

In practical applications of a mobile communications system, transmissions between devices, for example between a mobile station, also known as a mobile terminal, a user equipment ("UE"), etc., and a base station, also known as a base transceiver station, a fixed terminal, a Node B, etc., encounter a variety of reflective surfaces (e.g., buildings, vehicles, etc.). These surfaces reflect a transmitted signal causing multiple copies of the signal to arrive at the receiver at different times and with varying amplitudes. Rather than attempting to suppress the multi-path signals, CDMA systems use the multi-path signals to improve receiver performance using rake demodulation.

Rake demodulation comprises separately despreading the different resolvable multi-paths, or "fingers," of a CDMA radio link, and constructively combining them to produce a signal having improved signal-to-noise ratio. A rake receiver performs finger despreading by correlating a given antenna sample stream with the channel's PN code shifted by the delays identified for each finger.

Correlation techniques are extensively employed in rake receivers. In addition to finger despreading, a variety of other tasks including early-ontime-late ("EOL") finger tracking, path searching, and preamble detection rely on correlation. A rake receiver may be provided with hardware accelerators to facilitate the correlation tasks. For example, one or more correlation coprocessors may perform despreading and finger tracking, while one or more additional correlation coprocessors may execute path searching. A set of specific correlation coprocessors may be dimensioned for the nominal distribution of the various correlation tasks encountered in a given cellular environment. While this strategy provides optimal correlation performance for the nominal task distribution, it results in degraded performance for extreme distributions.

SUMMARY

Accordingly, various techniques are herein disclosed for providing a correlation co-processor for use in CDMA receivers. In accordance with at least some embodiments, a method includes correlating a digitized spread spectrum signal with a pseudo-noise code to produce a correlated signal. The correlated signal is interpolated to produce an interpolated signal, and the interpolated signal is provided to a receiver processing system.

In other embodiments, an apparatus includes a correlator that correlates a received spread spectrum signal to produce a correlated signal. An interpolator is coupled to the correlator. The interpolator interpolates the correlated signal to produce an interpolated signal.

In yet other embodiments, apparatus includes an interpolator that interpolates a digitized spread spectrum signal to produce an interpolated signal, and further includes a correlation block coupled to the interpolator. The correlation block includes a correlation input buffer coupled to the interpolator, and a plurality of correlators coupled to the correlation input buffer. The plurality of correlators correlate the interpolated signal to produce a plurality of correlated signals. The correlators reuse signal samples previously transferred from the correlation input buffer to reduce the number of signal samples transferred from the correlation input buffer per correlation.

In further embodiments, apparatus includes means for correlating a received spread spectrum signal with a pseudo-noise code to produce a correlated signal. A means for interpolating produces an interpolated signal by interpolating the correlated signal. A means for storing the interpolated signal allows for provision of the interpolated signal to a receiver processing system.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed present disclosure to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for performing correlation operations in a wireless receiver. The embodiments of the present disclosure employ a Generic Correlation Coprocessor ("G-CCP") and may be used to optimize rake demodulation in a CDMA base station. The term "generic" as used herein in connection with the Generic Correlation Coprocessor indicates that, in contrast to specific correlation coprocessors, the correlation coprocessor of the present disclosure is not configured to accommodate a particular distribution of correlation tasks.

The distribution of the various correlation tasks (finger despreading, finger tracking, path searching, etc.) performed in a CDMA receiver is dependent on many factors. Different receiver designers choose to distribute correlation tasks as a matter of preference. The receiver's deployment environment, for example macro-, micro-, or pico-cell, affects the distribution, as does the life-stage of the receiver (early deployment for coverage or final deployment for capacity). A CDMA receiver may include hardware accelerators, in the form of correlation coprocessors to facilitate correlation operations. Such receivers may use at least two specific correlation coprocessors, one to perform finger processing, and another to perform path processing. A specific set of correlation coprocessors is dimensioned for a nominal distribution of correlation tasks, and therefore provides optimal performance for that nominal distribution, with performance degrading as the task distribution deviates from nominal. The Generic Correlation Coprocessor of the disclosed embodiments, generally, outperforms the specific correlation coprocessors for a wide range of task distributions outside the nominal distribution for which the specific correlation coprocessors are designed.

Figure 1:
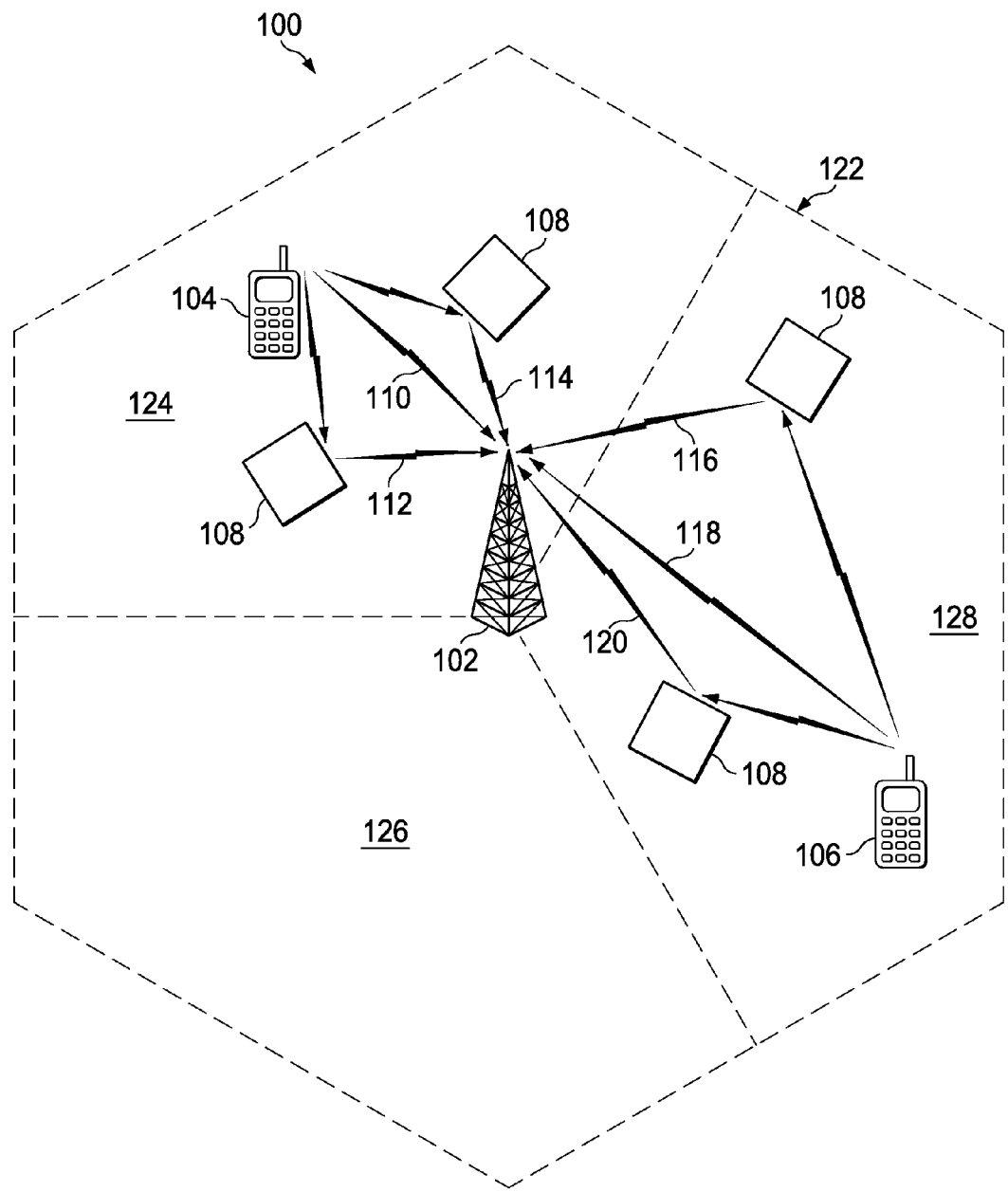
FIG. 1 shows an illustrative wireless network in accordance with embodiments of the invention.

FIG. 1 shows an illustrative wireless network 100. The illustrative telecommunications network includes a single base station 102, though in operation, a wireless network may include more base stations. The base station 102 is operable over the illustrated coverage area (cell) 122 which, in this example, is sub-divided into three sectors 124, 126, 128. In practice, a base station's coverage area may be subdivided into more of fewer sectors. Two mobile terminals 104, 106 are illustrated within the cell 122. An operating wireless network may include one or more mobile terminals.

When a mobile terminal 104, 106 is surrounded by obstacles 108 (e.g., buildings, vehicles, etc), its transmissions may be reflected creating multiple paths between the mobile terminal 104, 106 and the base station 102. Consequently, multiple time-delayed and amplitude-variant copies of the transmission arrive at the base station 102. In FIG. 1, mobile terminal 104 transmissions are reflected by obstacles 108 and are received by base station 102 as signals 110, 112, and 114. Mobile terminal 106 transmissions are reflected by obstacles 108 and are received by base station 102 as signals 116, 118, and 120.

The wireless network 100 may employ CDMA technology. Therefore, prior to transmission, the data signals to be transmitted by mobile terminals 104, 106 are spread using PN codes assigned to the mobile terminals 104, 106 by the base station 102. The base station 102 correlates the received signal with the assigned PN code to extract the transmitted data. The base station 102 preferably includes a rake receiver to identify, track, despread, and constructively combine the multi-path signals 110, 112, 114 received from mobile terminal 104, thus enhancing the signal-to-noise ratio of the received signals.

Within the rake receiver, the path monitoring function endeavors to identify the strongest multi-path signals for despreading and combining. Finger tracking attempts to maintain the optimal phase for despreading. As noted above, despreading applies a PN code to extract data from the spread signal. Each of these operations employs correlation. The receiver of base station 102 may include a correlation coprocessor to facilitate finger despreading, finger tracking, path monitoring, and other operations requiring correlation. The receiver of base station 102 preferably includes a Generic Correlation Coprocessor as disclosed herein to enhance chip-rate correlation performance over a wide range of correlation task distributions.

Figure 2:
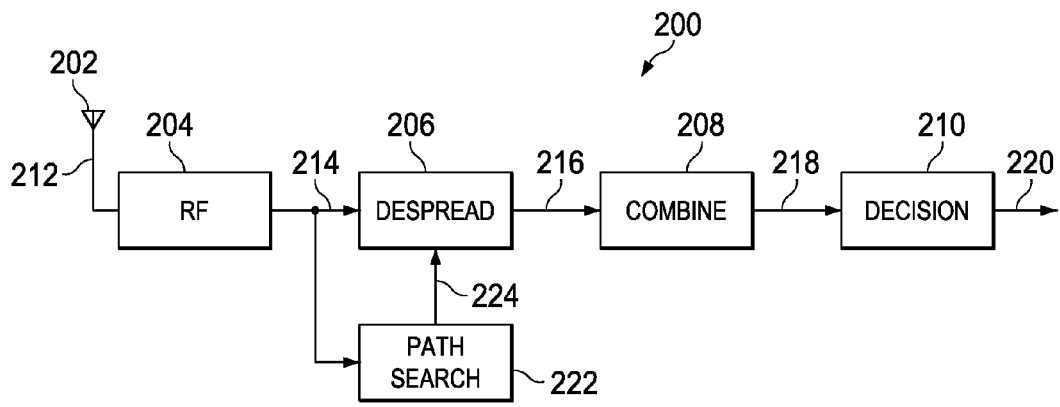
FIG. 2 shows an illustrative block diagram of a CDMA receiver in accordance with embodiments of the invention.

FIG. 2 shows an illustrative block diagram of a CDMA rake receiver in accordance with embodiments of the invention. The receiver 200 includes antenna 202 to receive transmitted radio frequency signals. In practice, antenna 202 may comprise a plurality of antennas. Radio frequency signals 212 received by antenna 202 are directed to RF component 204 where the signals 212 are down-converted and digitized to produce baseband signals 214. Baseband signals 214 may be sampled, for example, at the chip rate or at twice the chip rate (i.e. 2 samples per chip). Baseband signals 214 are directed to despreader 206 and to path searcher 222. The path searcher 222 searches for and identifies the strongest multi-path signals and their corresponding time delays. Correlation is employed to identify the points in time of maximal power reception corresponding to each PN code in use. Information signals 224 identifying the antenna streams and delay times for each identified multi-path signal are provided to despreader 206.

Figure 3:
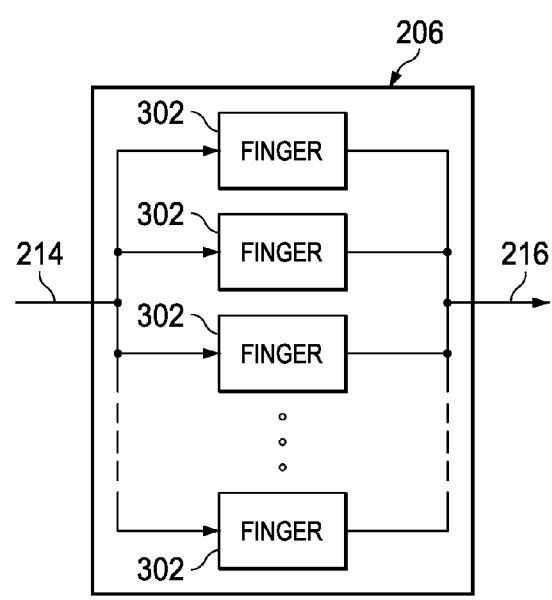
FIG. 3 shows a illustrative block diagram of a multi-finger rake receiver in accordance with embodiments of the invention.

FIG. 3 further illustrates the rake despreader 206 as comprising a plurality of rake fingers 302 in accordance with embodiments of the invention. Each rake finger 302 despreads a signal (e.g. 110, 112, or 114) resulting from a travel path between the transmitting unit 104 to the receiving unit 102 as identified by the path searcher 222. As indicated by the plurality of fingers 302, a number of the received multi-path signals 110, 112, 114, resulting from reflections of a mobile terminal transmission, will be despread for subsequent combining. The rake fingers 302 correlate the baseband signal 214 against a delayed version of the PN code used to the spread the data signal at the mobile terminal 104. Note that interpolation may be applied to the baseband signal to increase its sampling rate prior to despreading in some embodiments.

Finger tracking attempts to maintain optimal time alignment of the chips during despreading. To facilitate finger tracking, a stream of chips may be despread at timings prior to (early) and subsequent to (late) the anticipated on-time point. If the signal power associated with the early or late correlations exceeds the signal power of the on-time correlation, the point in time of higher power may be labeled the on-time point. Thus, despreading may maintain synchronization with each received multi-path as the transmitter and reflectors move in relation to the base station.

Despread multi-path signals 216 are directed to combiner 208 where the signals are constructively combined using, for example maximum ratio combining, to improve the signal-to-noise ratio of the combined signal 218. Combined signal 218 is directed to decision block 210 where symbol decisions are made using, for example, soft decision Viterbi decoding to produce estimates of the transmitted symbols 220.

Figure 4:
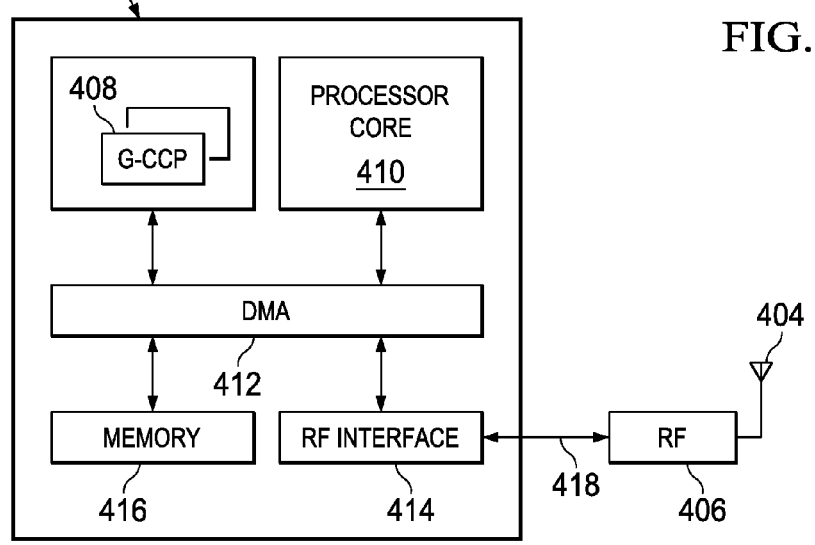
FIG. 4 shows an illustrative block diagram of a processor architecture including a Generic Correlator Coprocessor in accordance with at least some preferred embodiments of the invention.

FIG. 4 shows a block diagram of a CDMA receiver employing a Generic Correlation Coprocessor to perform rake receiver chip-rate correlations in accordance with preferred embodiments of the invention. The system of FIG. 4 includes one or more antennas 404 to transmit radio frequency signals and to receive radio frequency signals transmitted by, for example, a mobile terminal 104. RF module 406, coupled to antenna 404, contains components for transmitting and receiving radio frequency signals on a wireless network 100. Received radio frequency signals are down-converted to baseband and digitized in the RF module 406. The baseband signals may be sampled, for example, at twice the chip rate. Baseband processing system 402 is coupled to RF module 406. Digitized baseband signals 418 may be transferred to processing system 402 through RF interface 414. Direct memory access ("DMA") subsystem 412 may transfer baseband signal samples into memory 416, making the samples available to the processor 410 and to the Generic Correlation Coprocessor ("G-CCP") 408 for baseband processing. Alternatively, the DMA subsystem 412 may transfer baseband samples into an internal buffer in the G-CCP 408, the processor, or other unillustrated sub-system. Note that, as illustrated, one or more G-CCPs 408 may be included in baseband processing system 402.

Processor core 410 may comprise any number of digital signal processor cores adapted for CDMA signal processing. The G-CCP 408 offloads correlation processing from the processor core 410, thus the G-CCP 408 performs the correlations required for finger despreading, finger tracking, path searching, etc., in lieu of the processor 410 or task specific correlation coprocessors. Various CDMA receiver non-correlation tasks may be performed by the processor 410 or by other coprocessors (not shown) included in the system.

In some embodiments the processor 410 may configure the DMA controller 412 to transfer antenna stream samples 418 from the RF Interface 414 to the G-CCP 408, and to transfer correlation results from the G-CCP 408 to memory 416. The processor 410 also may configure the G-CCP 408 to perform the correlation operations required by the CDMA receiver, for example, correlations required to perform finger despreading and tracking, and path searching. The G-CCP 408 correlates the digitized antenna samples 418 at the chip rate to produce, for example, despread symbols or correlation energies. The correlation results may be transferred to memory 416 via DMA controller 412 for further symbol rate processing by the processor 410.

Figure 5:
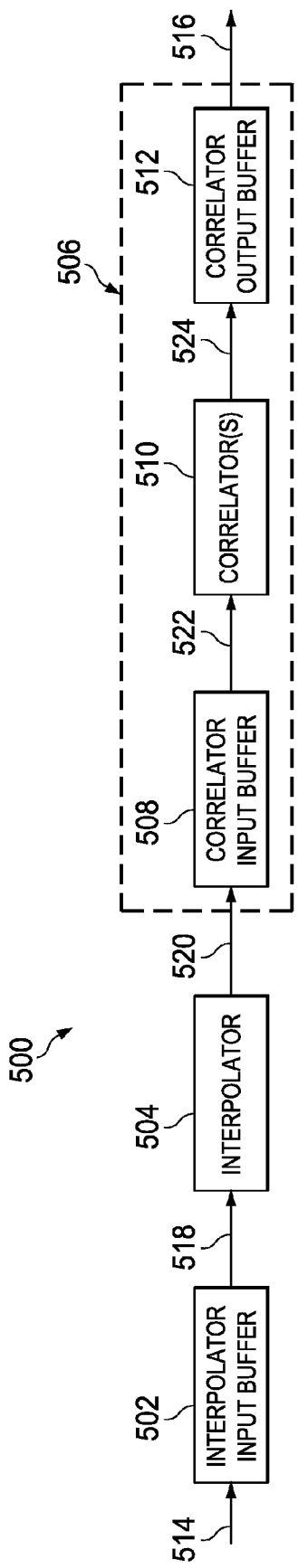
FIG. 5 shows a block diagram of a Generic Correlator Coprocessor in accordance with embodiments of the invention.

FIG. 5 shows a block diagram of a first illustrative embodiment of a G-CCP 500. Antenna stream samples 514, digitized at, for example, twice the chip rate are transferred to the G-CPP 500 and stored in an interpolator input buffer 502. The transfer rate into the interpolator input buffer is Na×Ns1×Rc, where Na is the number of antennas (e.g., 48), Ns1 is the number of samples per chip prior to interpolation (e.g., 2), and Rc is the number of chips per second (e.g., 3,840,000 in a W-CDMA system). Stored samples 518 are provided from the interpolator input buffer 502 to an interpolator 504 which performs interpolation operations to increase the sample rate of the data stream 520 supplied to a correlation block 506. Interpolator 504 transforms sample stream x(n,a) 518 into sample stream $\tilde{x}(n,v,a)$ 520 in accordance with:

$$\tilde{x}(n, v, a) = \sum_{q=1}^{q=Nq} x(n + q - Nq/2, a) \times h(q, v), \quad (1)$$

where Nq is the number taps in the interpolation filter, h is an interpolation coefficient, a is an antenna ID, n is a sample ID, v is an interpolation phase, and q is an interpolation tap ID. Eight times the chip rate may be considered adequate sampling to facilitate accurate despreading, resulting in a 4× interpolation rate when the antenna stream 514 is sampled at twice the chip rate. Thus, interpolator 504 reads antenna stream samples 518 from the interpolator input buffer 502 at the same rate at which the samples 514 were written to the buffer 502, and supplies samples 520 to the correlation block 506 at a rate of Na×Ns2×Rc, where Ns2 is the post-interpolation number of samples per chip period (e.g., 8).

The G-CCP 500 includes one or more correlation blocks 506. Note that due to the large number of correlations required by a CDMA base station receiver, operating multiple correlators in parallel at a lower processing rate is preferable to operating a single correlator at a higher processing rate. Each correlation block 506 includes a correlator input buffer 508 to store interpolated samples 520 generated by interpolator 504, one or more correlators 510 to correlate sample streams 522 provided from the correlator input buffer 508, and a correlator output buffer 512 to store correlation results 524. Correlations 516 are provided from correlator output buffer 512 to other receiver systems for further processing.

Correlator 510 transforms sample stream $\tilde{x}(n,v,a)$ 522 into correlation stream $\tilde{y}(s,t,v,a)$ 524 in accordance with:

$$\tilde{y}(s, t, v, a) = \sum_{c=1}^{c=Nc} \tilde{x}(s + 2c - 2, v, a) \times u(t + c - 1), \quad (2)$$

where Nc is the number of chips per correlation (e.g. 32), u is a code chip, a is an antenna ID, c is a correlation chip ID, v is an interpolation phase, s is a sample signal offset, and t is a code chip offset. In the architecture of G-CPP 500, the storage efficiency of the correlator input buffer 508 may be traded off for correlator 510 processing efficiency by choosing the number of correlation blocks 506 and the number of correlators 510. As the number of correlators 510 per correlation block 506 increases, correlation process efficiency decreases and correlator input buffer 508 efficiency increases. Thus, because the G-CCP 500 executes, at most, one correlation task per correlation block 506 per correlation clock cycle, the greater the number of correlation blocks 506, the greater the number of correlator input buffers 508 containing redundant samples, and the greater the amount of correlator input buffer storage wasted storing the redundant samples. Correspondingly, because a correlation task executes on a correlation block 506, the task occupies all the correlators 510 within that correlation block 506. If the task requires only a single correlator 510, the remaining correlators 510 within the correlation block 506 are wasted, so, as the number of correlators 510 per correlation block 506 increases, the number of wasted correlations also increases reducing correlator efficiency. To balance correlator input buffer 508 storage efficiency and correlator 510 processing efficiency, a preferred embodiment of the G-CPP 500 may provide three correlation blocks 506 with each correlation block 500 containing eight correlators 510.

Each correlation of a path monitoring task shares Nc−1 samples with correlation i−Ns1 and Nc−1 samples with correlation i+Ns1. Preferred embodiments of a G-CCP may reuse samples previously transferred from the correlator input buffer to a correlator to execute Ns1×N1 correlations over Nc chips while transferring Ns1×(Nc*N1−1) samples rather than Ns1×Nc*N1 samples.

Returning now to the interpolation and correlation algorithms, equations 1 and 2 can be combined to yield:

$$\tilde{y}(s, t, v, a) = \sum_{c=1}^{c=Nc}\left(\sum_{q=1}^{q=Nq} x(s+2c+q-Nq/2-2, a) \times h(q, v)\right) \times u(t+c-1), \quad (3)$$

and $$\tilde{y}(s, t, v, a) = \sum_{q=1}^{q=Nq}\left(\sum_{c=1}^{c=Nc} x(s+2c+q-Nq/2-2, a) \times u(t+c-1)\right) \times h(q, v). \quad (4)$$

Equations 3 and 4 can be split to produce:

$$y(s, t, a) = \sum_{c=1}^{c=Nc} x(s+2c-2, a) \times u(t+c-1), \quad (5)$$

and $$\tilde{y}(s, t, v, a) = \sum_{q=1}^{q=Nq} y(s+q-Nq/2, t, a) \times h(q, v). \quad (6)$$

Figure 6:
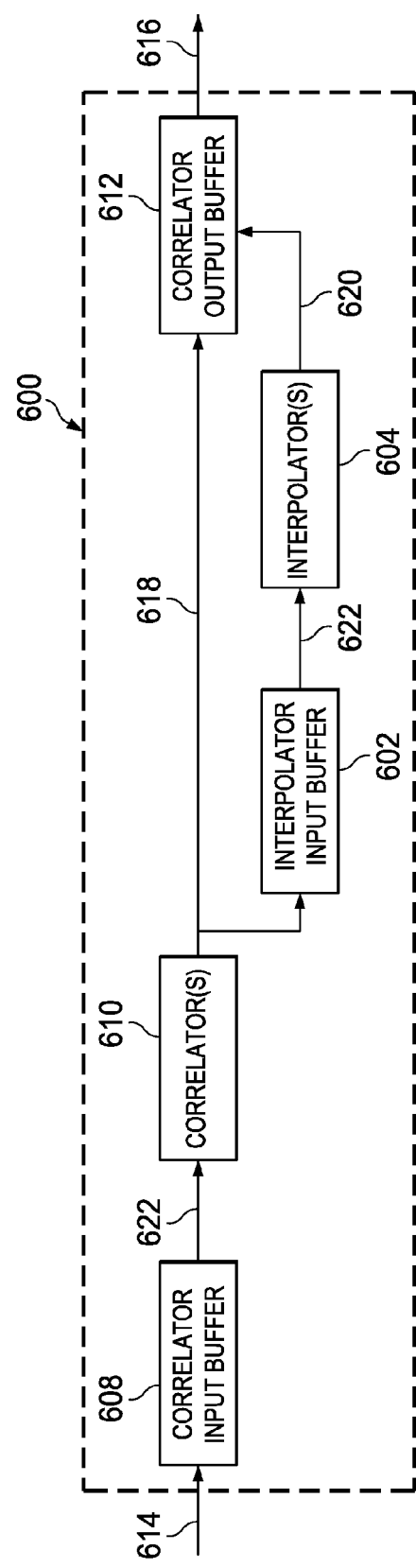
FIG. 6 shows a shows a block diagram of a Generic Correlator Coprocessor in accordance with preferred embodiments of the invention.

Consequently, the interpolator 504 and the interpolator input buffer 502 may be moved from ahead of the correlator 510 to behind the correlator 510, resulting in the preferred embodiment of a G-CCP chip-rate correlation block illustrated in FIG. 6. In this embodiment the correlator 610 implements the transformation of equation 5, and the post correlator interpolator 604 implements the transformation of equation 6. A preferred embodiment of a G-CCP may contain one or more correlation blocks 600.

In the correlation block 600 of FIG. 6, antenna stream samples 614 are stored in the correlator input buffer 608. As described above, the antenna stream may be sampled twice per chip. Thus, because the correlator input buffer 608 stores the uninterpolated rather than the interpolated data stream, placing the interpolator 604 behind the correlator 610 allows the size of the correlator input buffer 608 to be reduced by a factor of four (assuming 2× antenna stream sampling and 4× interpolation). Additionally, while the $\tilde{y}(s,t,v,a)$ computation of equation 6 appears to require a fourfold increase in the number of correlators 610, in fact, no additional correlators 610 are required if the number of interpolator filter taps (e.g., 4) is less than or equal to the number of correlators 610 per correlation block 600. This follows from the fact that path searching tasks do not require interpolation, and therefore require no additional correlators. While finger despreading tasks and finger tracking tasks do require interpolation, these tasks use only a single correlator 610, so correlation blocks 600 containing multiple correlators 610 have idle correlators 610 that may be applied for interpolation.

One or more correlators 610 are provided with antenna stream samples 622 from correlation input buffer 608 and produce correlations 618. In the case of a correlation task not requiring interpolation, for example, a path searching task, the correlations 618 are written directly into the correlator output buffer 612. For correlation tasks requiring interpolation, for example, a finger despreading task or a finger tracking task, the correlations 618 are written to the interpolation input buffer 602.

The correlation block 600 includes one or more interpolators 604 coupled to interpolation buffer 602. Multiple interpolators 604 may be employed to improve correlation process efficiency as follows: Given Nz2 correlations y(s+i,t,a) where Nz2 is the number of correlators 610 per correlation block 600 and i goes from 0 to Nz2−1, an interpolator 604 can generate any correlation 620 between $\tilde{y}1(t,a)=\tilde{y}(s1,t,v1,a)$ and $\tilde{y}2(t,a)=\tilde{y}(s2,t,v2,a)$ with s1=s+1, s2=s+Nz2−2, v1=0, and v2=1−Ns1/Ns2. The signal distance between $\tilde{y}1(t,a)$ and $\tilde{y}2(t,a)$ is Nz2−2−Ns1/Ns2 sample periods. The signal distance between the first correlation and the third correlation of a finger tracking task is not more than 2×Ns1×(1−1/Ns2) sample periods. Thus, starting from Nz2 correlations, three interpolators can generate three correlations of a finger tracking task if Nz2≧2×Ns1+2=6.

Interpolation input buffer 602 provides buffered correlations 622 to one or more interpolators 604. Interpolated correlations 620, produced by the at least one interpolator 604, are stored in the correlator output buffer 612. Correlations 616 are provided from correlator output buffer 612 to other receiver systems for further processing. A preferred embodiment of a G-CCP employing the preferred embodiment of the correlation block 600 may provide two correlation blocks 600. Each correlation block 600 may provide eight correlators 610 and three post-correlation interpolators 604.

The correlator input buffer 608, correlator output buffer 612, and interpolator input buffer 602 may be constructed using a wide variety of integrated circuit memory technologies including all forms of static or dynamic random access memory. Likewise the correlator 610 and interpolator 604 may be implemented as programmable functions executing microcode or software programs, or as fixed or programmable logic modules.

Figure 7:
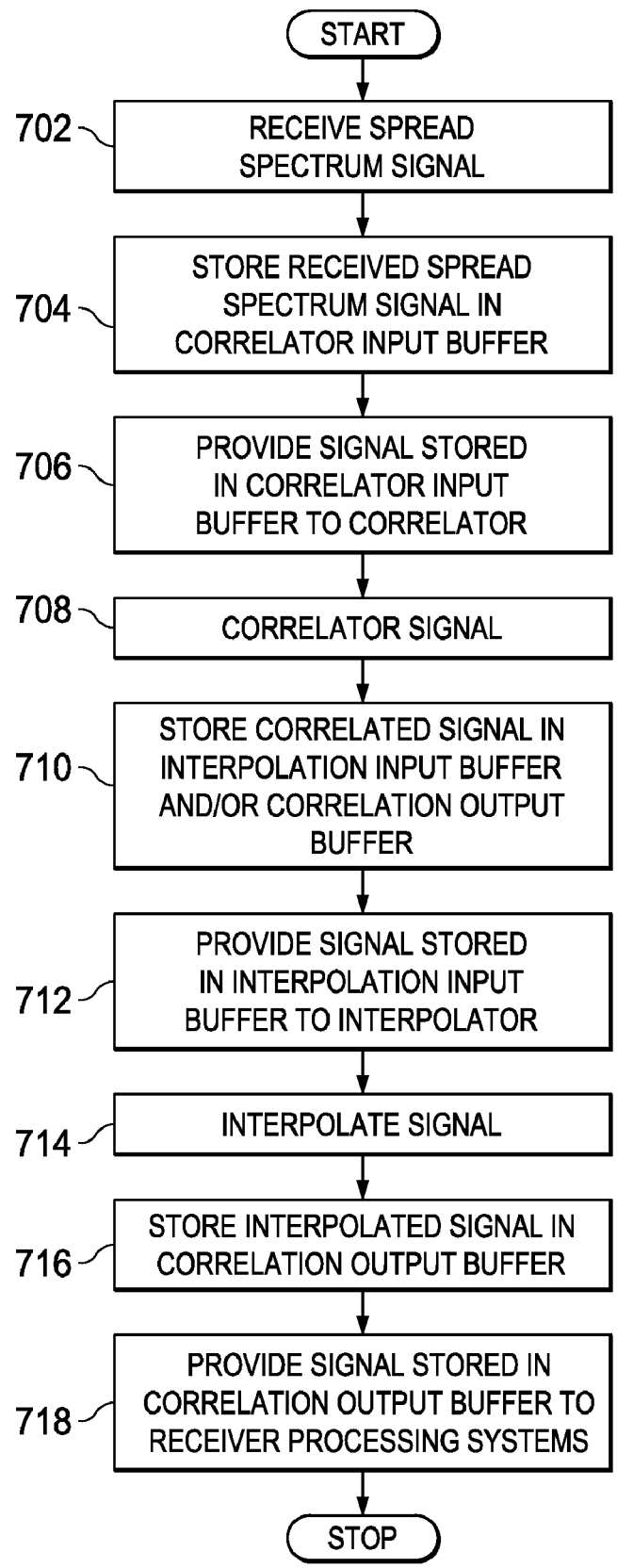
FIG. 7 shows a flow diagram of a method for Generic Correlator Coprocessor operation in accordance with at least some preferred embodiments of the invention.

FIG. 7 shows a flow diagram of an illustrative method for providing correlation in a CDMA receiver in accordance with preferred embodiments of the invention. Though depicted sequentially as a matter of convenience, at least some of the actions shown can be performed in a different order and/or performed in parallel. In block 702, a spread spectrum radio frequency signal is received. The spread spectrum signal is preferably a direct spread spectrum signal, for example, as provided for in UMTS W-CDMA wireless communications systems. The received spread spectrum signal is down converted to baseband frequencies and digitized. The baseband signal may be sampled, for example, at twice the chip. Note that spread spectrum signals may be received via one or more antennas resulting in one sample stream per antenna.

The received spread spectrum signals, after down conversion to baseband and digitization, are provided to the G-CCP and stored in a correlator input buffer 608 in block 704. The stored baseband signals are read from the correlator input buffer 608, in block 706, and provided to one or more correlators 610. In block 708, the one or more correlators 610 correlate the received signal in accordance with the various tasks for which correlation is required in a CDMA receiver, for example, finger despreading, finger tracking, path searching, preamble detection, etc. The resulting correlations 618 are stored in an interpolation input buffer 602 and/or a correlation output buffer 612 in block 710.

Correlations are read from the interpolation input buffer 602 and provided to one or more interpolators 604 in block 712. The preferred embodiments of a G-CCP advantageously include one or more interpolators 604 after the one of more included correlators 610. This arrangement reduces the correlator input buffer 608 storage requirement and provides improved correlation efficiency. In block 714, the one or more interpolators 604 process the correlations provided from the interpolation input buffer 602 to generate an interpolated signal having a sample rate, for example, four times that of the correlation signal stored in the interpolator input buffer 602. The interpolated signal is stored in the correlation output buffer 612 in block 716. Signal stored in the correlation buffer 612 is provided to other systems in the receiver, in block 718, for further processing.

While illustrative embodiments of this present disclosure have been shown and described, modifications thereof can be made by one skilled in the art without departing from the spirit or teaching of this present disclosure. The embodiments described herein are illustrative and are not limiting. Many variations and modifications of the system and apparatus are possible and are within the scope of the present disclosure. Accordingly, the scope of protection is not limited to the embodiments described herein, but is only limited by the claims which follow, the scope of which shall include all equivalents of the subject matter of the claims.

What is claimed is:

1. A method comprising:
   configuring a plurality of correlators and a plurality of interpolators of a correlation co-processor to selectably perform path monitoring, finger tracking, and finger despreading, wherein each correlator and each interpolator is configured to selectably perform each of path monitoring, finger tracking, and finger despreading in a code division multiple access receiver;
   correlating, by the correlators, a received spread spectrum signal with a pseudo-noise code to produce a plurality of correlated signals;
   interpolating, by the interpolators, the plurality of correlated signals to produce a plurality of interpolated signals;
   storing the interpolated signal for provision to a receiver processing system;
   storing the received spread spectrum signal for provision to the correlators;
   wherein the interpolating comprises interpolating the plurality of correlated signals to produce any interpolated correlation within $Nz2-2-Ns1/Ns2$ sample periods of an earliest of the correlated signals provided to the interpolators, where:
   $Nz2$ is a total number of correlators coupled to the interpolators;
   $Ns1$ is the number of samples per chip prior to interpolation; and
   $Ns2$ is the post-interpolation number of samples per chip.

2. The method of claim 1, further comprising configuring the interpolators to perform no interpolation based on the correlators selectably performing path monitoring.

3. The method of claim 1, further comprising transferring the correlated signals to an interpolator input buffer based on the correlators selectably performing one of finger tracking and finger despreading.

4. The method of claim 1, further comprising transferring the correlated signals to a correlator output buffer, and bypassing an interpolator input buffer, based on the correlators selectably performing path monitoring.

5. The method of claim 4, further comprising transferring to the correlators no more than two samples per chip to perform each of a path monitoring correlation task, a finger despreading correlation task, and a finger tracking correlation task.

6. A system comprising:
   a correlation coprocessor comprising:
      correlators that correlate a received spread spectrum signal with a pseudo-noise signal to produce a plurality of correlated signals;
      interpolators coupled to the correlators, the interpolators interpolate the plurality of correlated signals to produce a plurality of interpolated signals;
      a correlator input buffer coupled to the correlators, the correlator input buffer stores the received spread spectrum signal for provision to the correlators;
      a correlation output buffer coupled to an output of the interpolators, the correlation output buffer stores the interpolated signals for provision to a receiver processing system;
      wherein the correlators and the interpolators are configured to selectably perform each of path monitoring, finger tracking, and finger despreading in a code division multiple access receiver;
      wherein the interpolators interpolate the correlated signals to produce any interpolated correlation within $Nz2-2-Ns1/Ns2$ sample periods of an earliest of the correlated signals provided to the interpolators, where:
      $Nz2$ is a total number of correlators coupled to the interpolators;
      $Ns1$ is the number of samples per chip prior to interpolation; and
      $Ns2$ is the post-interpolation number of samples per chip.

7. The system of claim 6, wherein the correlator input buffer is dimensioned to store, at most, two samples per chip, and wherein the correlators receive, at most, two samples per given chip over all correlations of the given chip.

8. The system of claim 6, wherein the correlators reuses received signal samples previously transferred from the correlation input buffer thereby reducing the number of received signal samples transferred from the correlation input buffer per correlation.

9. The system of claim 6, further comprising an interpolator input buffer coupled to an output of the correlators and coupled to an input of the interpolators, the interpolator input buffer stores the correlated signals for provision to the interpolators.

10. The system of claim 6, wherein the correlation output buffer is coupled to an output of the correlators, the correlation output buffer stores the correlated signals for provision to the receiver processing system.

11. The system of claim 10, wherein the correlators transfer correlated signals to the correlation output buffer based on the correlators selectively performing path monitoring, and the interpolators transfers interpolated signals to the correlation output buffer based on the interpolators selectively performing one of finger tracking, and finger despreading.

12. The system of claim 6, further comprising radio frequency components for transmitting and receiving signals on a wireless network.

13. A system comprising:
   means for correlating a received spread spectrum signal with a pseudo-noise signal to produce a correlated signal;
   means for interpolating the correlated signal to produce an interpolated signal; and
   means for storing the interpolated signal for provision to a receiver processing system;
   means for storing the received spread spectrum signal for provision to the means for correlating;
   wherein the means for correlating correlates the received spread spectrum signal with a pseudo-noise code to produce a plurality of correlated signals;
   wherein the means for interpolating the correlated signal interpolates the plurality of correlated signals to produce a plurality of interpolated signals;
   wherein the means for correlating and the means for interpolating are programmable to selectably perform each of path monitoring, finger tracking, and finger despreading in a code division multiple access receiver;
   wherein the means for interpolating the correlated signal interpolates the plurality of correlated signals to produce any interpolated correlation within
      $Nz2-2-Ns1/Ns2$ sample periods of an earliest of the correlated signals provided to the means for interpolating, where:
      $Nz2$ is a total number of correlators of the means of correlation coupled to the means for interpolation;
      $Ns1$ is the number of samples per chip prior to interpolation; and
      $Ns2$ is the post-interpolation number of samples per chip.

14. The system of claim 13, further comprising means for storing the correlated signal for provision to the means for interpolating.

15. The system of claim 13, further comprising means for storing the correlated signal for provision to a receiver processing system.

* * * * *